Jan. 11, 1938. H. VOGT ET AL Re: 20,621

DEVICE FOR PHONOGRAPHS WITH LINEAR PHONOGRAM CARRIERS

Original Filed March 20, 1922 3 Sheets-Sheet 1

Inventors
H. Vogt
J. Massolle and
J. Engl.

by Munn & Co.

Attorneys.

Jan. 11, 1938. H. VOGT ET AL Re. 20,621

DEVICE FOR PHONOGRAPHS WITH LINEAR PHONOGRAM CARRIERS

Original Filed March 20, 1922 3 Sheets-Sheet 2

Inventors.
H. Vogt
J. Massolle and
J. Fingl.
by
Attorneys.

Jan. 11, 1938. H. VOGT ET AL Re. 20,621

DEVICE FOR PHONOGRAPHS WITH LINEAR PHONOGRAM CARRIERS

Original Filed March 20, 1922 3 Sheets-Sheet 3

WITNESSES

W. A. Williams.

INVENTORS

Hans Vogt
Joseph Massolle
BY Josef Engl
Munn & Co
ATTORNEYS

Reissued Jan. 11, 1938 Re. 20,621

UNITED STATES PATENT OFFICE 20,621

DEVICE FOR PHONOGRAPHS WITH LINEAR PHONOGRAM CARRIERS

Hans Vogt, Berlin-Steglitz, Joseph Massolle, Berlin-Glienicke, and Josef Engl, Berlin-Charlottenburg, Germany, assignors, by mesne assignments, to American Tri-Ergon Corporation, New York, N. Y., a corporation of New York Original No. 1,713,726, dated May 21, 1929, Serial No. 126,530, March 20, 1922. Application for reissue February 18, 1937, Serial No. 126,530

6 Claims. (Cl. 274—5)

The recording and the reproduction of sound waves by the use of linear phonogram carriers such as film strips, can only be effected in absolutely satisfactory manner, even after the removal of all other occurring difficulties, when the speed of the record carrier is uniform both for the receiving and the reproduction, and when in both cases no variations of any kind occur. Especially in the case of musical reproductions is the record extremely sensitive to the slightest variations of speed. Consequently, it has hitherto been usual to provide apparatuses such as phonographs and gramophones witth speed regulators. In these apparatuses, however, the problem of the uniform motion does not assume the same importance as in the case of sound recording or reproducing apparatus embodying linear phonogram carriers, such as photographic sound records on film strips or ribbons because with the former the record carrier consists of a cylinder or disc possessing a somewhat considerable momentum when the desired velocity is imparted thereto which equalizes any small irregularities in the motion, such as may be caused, for instance, by the driving mechanism. In the latter case, however, that of phonographs with linear records, such as film strips, the portion of the record which is active at a given moment possesses practically no momentum to be taken into consideration. Irregularities in the motion, such, for instance, as may be caused by the projections, the teeth, the belts, the connecting places, and so forth, or by the friction, at the guiding point, become consequently very much more important with these and thus greatly impair the periodicity of the sound recorded.

According to the present invention, this drawback which attaches to all hitherto known propulsion mechanisms for linear phonogram records is obviated by the arrangement, that the light sound record has given to it at the controlling point the property of a weighty mass. This is attained by the arrangement that the record carrier (a film strip or the like) is firmly pressed against one or more rollers connecting with a heavy rotating mass, so that the record moves in exact conformity with the rollers and the rotating mass.

Also, according to the present invention a dependable and highly efficient optical system is provided for use in conjunction with moving film strips of the above indicated character.

Various further and also various more specific objects, features and advantages will more clearly appear from the detailed description given below taken in connection with the accompanying drawings, which form a part of this specification.

The invention consists in such novel features, arrangements and combinations of parts and methods as may be shown, described and claimed in connection with the embodiments of the invention herein disclosed by way of example only.

Constructional examples of the invention are illustrated in the figures, in which:—

Figure 1:
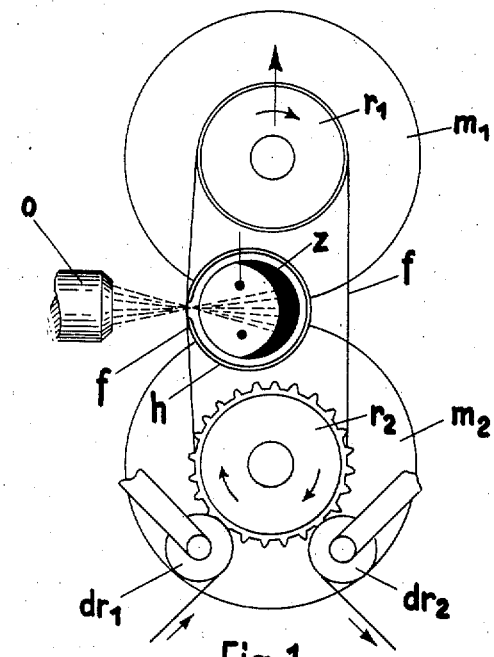
Figure 1 is a side elevation of a linear phonogram carrier.

Referring to Fig. 1, partially illustrating sound reproducing apparatus, the phonogram carrier, which in these illustrations is shown as a film strip bearing a photographic sound record, moves over the rollers $r'$, $r^2$, suitably coupled by gearing or belting, of which rollers preferably the roller $r^2$ directly driven by the motor is provided with teeth. One or even both rollers are rigidly connected with rotating masses as at $m'$, $m^2$, which give to the film strip $f$ travelling between them under tension the requisite uniformity of its motion. Between the rollers $r'$, $r^2$, there is placed preferably in a casing $h$ the light-sensitive cell $z$ sensitive to electric light, which is influenced by a light ray passing from a light source (not shown), through objective $o$, and then through the film. The rollers or idles $dr$, $dr^2$, press the film against the carrier roller $r^2$.

Figure 2:
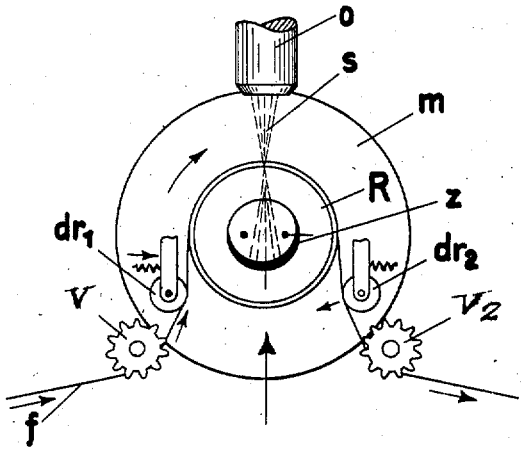
Figure 2 is a side elevation of a modified form of phonogram carrier.

Another construction of the invention is shown in Fig. 2, in which the little irregularities of movement often caused by the feeding of the film by the teeth on roller $r^2$, in the Fig. 1 construction, or which are caused by the mechanical vibrations of the stretches of film between rollers $r'$ and $r^2$, in the Fig. 1 construction, are avoided.

The film $f$ is drawn by the sprocket V to the controlling point $s$ and is removed from the controlling point by the sprocket $V^2$. Between these feeding sprockets, the film is guided over the periphery of a larger roller R on which it rests closely by friction, even during the turning motion. As the roller is rigidly connected with the rotating mass $m$, or can be constructed so as to be itself the rotating mass, the film moves uniformly on in like manner as the surface of the roller R. For the purpose of pressing the film upon the roller R, and for the equalizing of irregularities of motion, there are provided the spring-supported rollers $dr'$, $dr^2$. That is, the spring pressed rollers engaging the film at points between the feeding rollers and the fly wheel roller, thus exert resilient pressure against the film to force the film into effective engagement with the fly wheel and thereby at the same time the film is deflected from a straight line position, the extent of such deflection varying slightly with any irregularities in the movement of the film and its resulting tension, with the result that any such irregularities are effectively prevented from being imparted to the film at the point of translation. The light rays required for the illumination or the transmission of light through the film are thrown upon the film in the form of a narrow line by means of the objective $o$. When sound is to be reproduced from the photographic sound record on the film, the light rays pass through the film strip and fall upon the photo cell $z$ preferably placed in the interior of roller R. For this purpose, the roller is either partially transparent, made of glass, for example, or the part of the film bearing the sound record projects beyond the non-transparent parts of the roller.

In the hereinbefore described form of execution of the invention the driving of the film sound record is however not effected directly at the point of projection but in front or behind the same. The driving point of the film can however, in a further development of the invention, be arranged directly at the point at which light is projected through the record. The driving member can, in this case, be constructed in such a manner that the engaging and disengaging, of the feeding teeth of the film-feeding sprocket with the perforations of the film, will not affect the speed of the film at the projection point, i. e., at the point at which light falls upon the film in recording, or at which it passes through the film in reproducing.

Figure 4:
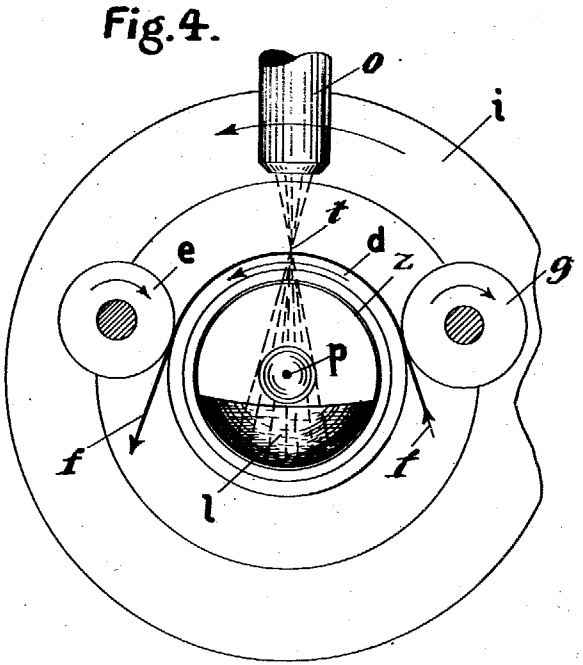
Figure 4 is an end view of the form of carrier shown in Figure 3.
Figure 3:
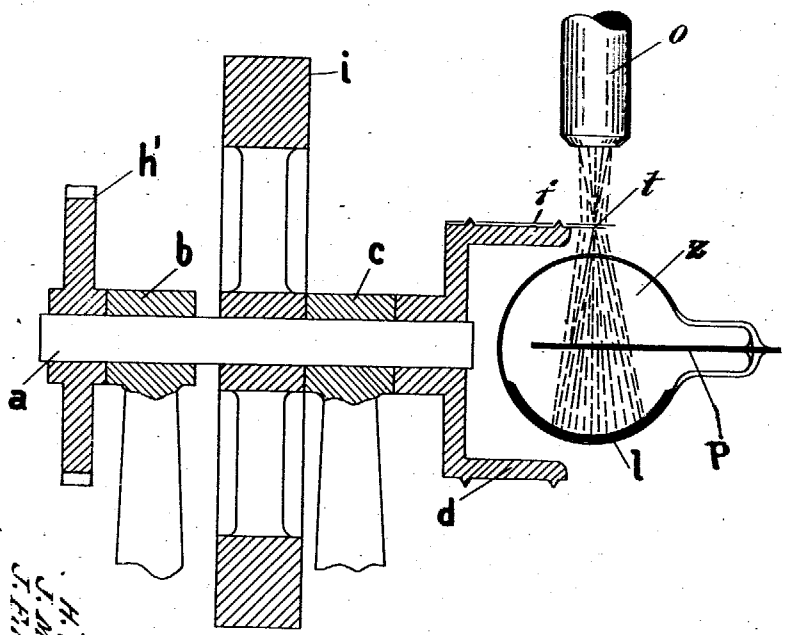
Figure 3 is a longitudinal section of another form of phonogram carrier.

Figures 3 and 4 show this form of construction by way of example. The shaft $a$ journalled at $b$ and $c$, carries at one end the feeding-cylinder $d$ which has the customary teeth designed to engage with the perforations of the film. The film $f$ is in contact with one part of the circumference of this cylinder, the length of this part corresponding with the distance between the pressure rollers $e$ and $g$, Fig. 4. The driving member $h'$ such as a gear for example, and also the fly wheel $i$, are keyed upon this shaft and designed to communicate to the shaft and consequently to the cylinder $d$, a uniform revolving speed. The film will consequently move also with uniform speed, for instance in the direction $g$—$e$. These rollers $e$—$g$ press the film strip firmly against the cylinder $d$ so that it lies, without possibility of being shifted, upon the entire peripheral length of cylinder $d$ from $g$ to $e$, because of the feed teeth of cylinder $d$ engaging with the perforations of the film. The engagement and disengagement of the feed teeth on cylinder $d$, with the perforations of the film, takes place under the pressure of the rollers $g$ and $e$, Fig. 4, so that vibrations or jerky motions of the film band, due to such tooth engagement or disengagement, no longer make themselves felt at the point of light projection through the same. The free ends $f$—$f$ of the film band are preferably guided by rollers (not shown) for preliminary winding up in the manner well known in picture cinematography, so that they form a loop.

It will be understood that the invention is intended particularly for use in connection with transparent film records, on which sound is recorded photographically, by causing acoustically modulated light to act upon the film at the control point. Also that, in reproducing, light passes through the sound record on the film at the control point, and falls upon the photo-cell $z$ to set up currents corresponding, in frequency variations, to the sound record through which the light has passed. Also, that the film may pass from a supply reel on which it is wound, at the starting end, to a reel on which it is progressively wound, at the final end, as is usual in cinematography. Further, that the film contemplated may be a talking moving picture film, containing pictures in addition to the sound record. Such a record must be fed intermittently past the point at which the pictures are recorded on the film, or at which the projection light shines through the pictures in reproducing. In addition there is need of feeding the film uniformly past the point at which the sound is recorded or reproduced. For such film the loop referred to is preferably formed, between the point of intermittent feed for picture recording or projection, and the point of uniform motion for sound recording or reproducing, the production of such loops in the film being common in cinematography.

For recording purposes a solid cylinder or roller may be employed in place of the roller $d$ upon which the full width of the film strip will bear, since in recording the acoustically modulated light which is to be recorded need not pass through the film but only need act upon the sensitized upper surface thereof.

For reproducing purposes, a specially constructed roller $d$ is required. This is for the reason that the light from the projection light source, condensed by the lens $o$ to a narrow line at the surface of the film, must pass through the film and fall upon a light-sensitive element, for instance the cell $z$ with the cathode $l$ and anode $p$. The cylinder or roller $d$ in Figure 3 shows a form of construction by way of example in which the part of the film which carries the sound record projects beyond the edge of the cylinder. The light collected by the object glass $o$ to a narrow line, comes from a suitable known means or source of light projection so arranged, as indicated for example by the dotted lines in Figs. 3 and 4, that the converged narrow line of light is substantially focused or impinges upon the area of translation $t$ on the film as a line running transversely of the direction of movement of the film.

Certain features of this type of optical system are also disclosed in our Patent No. 1,590,185, issued June 29, 1926, application for which was filed on April 4, 1921, and the claims of which patent relate to divisional subject matter.

The sound record as indicated in Fig. 3 may be located at the outer side of one row of perforations in the film. The sound record markings can, however, if desired, be located between the two rows of perforations in the film, in which case only one row of perforations would be utilized for feeding the film, these perforations being engaged by the teeth on roller *d* nearest to the center of cell *z*. In this case the sound record portions of the film would still overhang the edge of roller *d*, the far overhanging edge of the film, moving along either without a special guidance or running over a roller with or without feeding teeth, which roller may be an idler or may be specially driven, as desired.

Another feature may advantageously be incorporated in the invention. If the driving shaft of the tone-film revolves with a low number of revolutions and if a rigid drive is used, the circumferential speed of fly wheels which can be practically utilized, will, under certain conditions, not be sufficient for compensating the speed fluctuations.

According to the invention the driving of the fly wheel axle is therefore effected with the aid of an elastic coupling, for instance a spring. This spring can be very feeble as, at constant speed, it has to overcome only the losses from friction of the driven part. As however, at the starting and stopping of the driving mechanism, the inertia of the fly wheel has to be overcome, it is advantageous to limit the play of the spring in either direction by a fixed stop.

Figure 6:
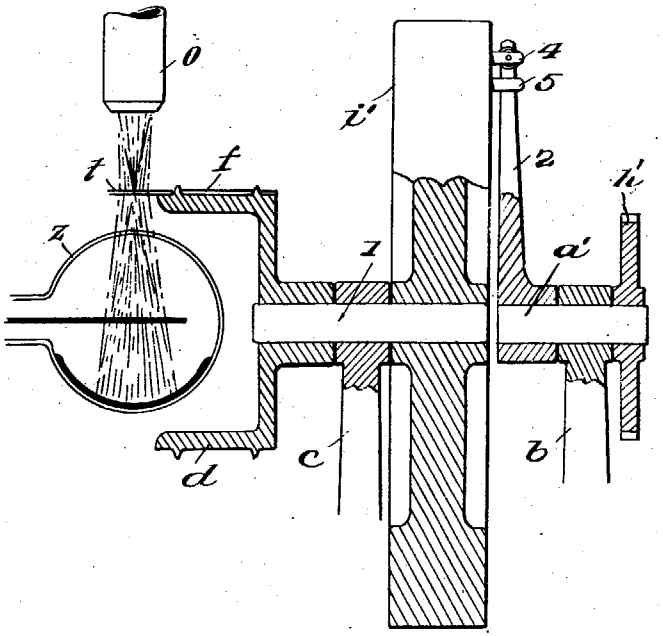
Figure 6 is a vertical section of the same.
Figure 5:
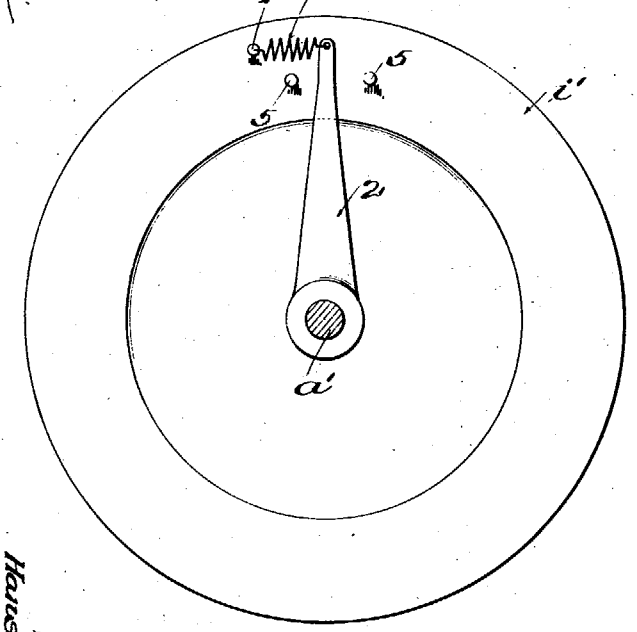
Figure 5 is a view in elevation of a fly wheel showing an elastic coupling adaptable to the rear side of the fly wheels, the face views of which are shown in various of the other figures.

Figures 5 and 6 show such a form of execution by way of example. The axle *l* of the wheel with the rotating mass *i'* is separate from the driving shaft *a'*. Upon the latter a lever 2 is arranged which drives the rotating mass through the intermediary of the spring 3 and of the stud 4 fixed to the fly wheel. The studs 5 which are also fixed on the fly wheel limit the stroke of the lever 2 at the starting and at the stopping so that the spring 3 is protected against excessive tension and against jumping out of position.

While the invention has been described in detail with respect to certain particular preferred examples which give satisfactory results, it will be understood by those skilled in the art after understanding the invention that various changes and modifications may be made without departing from the spirit and scope of the invention, and it is intended therefore in the appended claims to cover all such changes and modifications.

We claim:—

1. An apparatus for reproducing speech, music or the like sounds from vibrations recorded on a film strip, comprising a photoelectric cell, means for imparting to the film an arcuate, rapid and uniform motion longitudinally of the film past said cell, a source of light projection for providing a line of light in fixed position for translating the sound from the film strip moving uniformly past said light, and an objective lens in the neighborhood of the area of translation on the film strip but spaced therefrom for collecting said projected light and directing the same as a converging narrow line extending transversely of the direction of movement of the film strip and passing through the area of translation on the film and to said cell.

2. In combination, optical means for translating sound vibrations to or from a film record strip by the use of light varied in accordance with the sound, a constant speed film feeding mechanism for moving the film strip uniformly past said light, comprising a continuously rotating feeding roller, a flywheel, a roller over which the film passes and which roller is operatively connected to said flywheel, means to compensate for variations in the motion of the film arising from small irregularities in the motion of the film as fed by said feeding roller, said compensating means including a spring pressed roller engaging the film at a point between said feeding roller and said flywheel roller with a resilient pressure causing the film to be deflected a variable amount in passing over said spring pressed roller, the extent of such deflection varying with said irregularities of motion.

3. In combination, optical means for translating sound vibrations to or from a film record strip by the use of light varied in accordance with the sound, a constant speed film feeding mechanism for moving the film strip uniformly past said light, comprising a continuously rotating feeding roller, a flywheel, a roller over which the film passes and which roller is operatively connected to said flywheel, means to compensate for variations in the motion of the film arising from small irregularities in the motion of the film as fed by said feeding roller, said compensating means including a member yieldingly pressing against the film at a point between said feeding roller and said flywheel roller to variably deflect the film from a straight line path at such point.

4. In phonographic apparatus in which the sound record is photographically formed on a ribbon of inconsiderable mass comprising a film strip, the combination of a cylinder, a flywheel therewith, means for rotating said cylinder at uniform speed under control of said flywheel, means for feeding the film record strip onto said cylinder at one point and off therefrom at another point and causing the film strip to adhere closely to the cylinder without slippage between said points, said film record strip being arranged to overhang one end of the cylinder, a photo-electric cell positioned inwardly of the overhanging portion of the film, and means for directing light through said overhanging portion onto said photoelectric cell whereby sound is translated by the light from the film strip moving uniformly past said light.

5. An apparatus for reproducing speech, music or the like sounds from vibrations recorded on a film strip, comprising a photoelectric cell, means for imparting to the film an arcuate, rapid and uniform motion longitudinally of the film past said cell, a source of light projection for providing a line of light in fixed position for translating the sound from the film strip moving uniformly past said light, and an objective lens in the neighborhood of the area of translation on the film strip but spaced therefrom for collecting said projected light and directing the same as a converging narrow line extending transversely of the direction of movement of the film strip and passing through the area of translation on the film and to said cell, said means including a flywheel and means operatively connecting said flywheel with the film, which last named means imparts uniformity of motion of the flywheel to the film in passing through said line of light.

6. An apparatus for translating sound vibrations representative of speech, music or the like, to or from a film record strip by the use of a line of light varied in accordance with the sound, which comprises means for imparting to the film an arcuate, rapid and uniform motion longitudinally of the film past said line of light, and for retaining the moving film under tension at the area of translation, a source of light projection for providing a line of said light in fixed position, and an objective lens in the neighborhood of said area of translation on the film but spaced therefrom for collecting said projected light and directing the same as a converged narrow line impinging directly upon the arcuately moving film at said area of translation and transversely of the direction of movement of the film, said means including a flywheel and means operatively connecting said flywheel with the film, which last named means imparts uniformity of motion of the flywheel to the film in passing through said line of light.

HANS VOGT.
JOSEPH MASSOLLE.
JOSEF ENGL.